United States Patent
Ko

(10) Patent No.: US 11,414,069 B1
(45) Date of Patent: Aug. 16, 2022

(54) METHOD FOR PARKING GUIDANCE AND PARKING GUIDANCE SYSTEM

(71) Applicant: PIXART IMAGING INC., Hsin-Chu (TW)

(72) Inventor: Yi-Hsien Ko, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 17/205,351

(22) Filed: Mar. 18, 2021

(51) Int. Cl.
*B60W 30/06* (2006.01)
*G08G 1/16* (2006.01)
*G08G 1/14* (2006.01)

(52) U.S. Cl.
CPC ............. *B60W 30/06* (2013.01); *G08G 1/143* (2013.01); *G08G 1/146* (2013.01); *G08G 1/168* (2013.01)

(58) Field of Classification Search
CPC ....... B60W 30/06; G08G 1/143; G08G 1/146; G08G 1/168
See application file for complete search history.

(56) References Cited

U.S. PATENT DOCUMENTS

| | | | | |
|---|---|---|---|---|
| 2008/0136674 A1* | 6/2008 | Jang | ........................ | G08G 1/017 340/932.2 |
| 2011/0221624 A1* | 9/2011 | Kavaler | ................ | G08G 5/0082 342/22 |
| 2012/0044091 A1* | 2/2012 | Kim | ........................ | G08G 1/143 340/932.2 |
| 2012/0139757 A1* | 6/2012 | Ji | ........................... | G08G 1/143 340/932.2 |
| 2013/0135118 A1* | 5/2013 | Ricci | ....................... | G08C 19/00 340/932.2 |
| 2014/0225763 A1* | 8/2014 | Kavaler | ................ | B60W 30/06 342/70 |
| 2014/0329544 A1* | 11/2014 | Kim | ........................ | H04W 4/33 455/456.3 |
| 2015/0256630 A1* | 9/2015 | Hong | ...................... | G08G 1/146 715/739 |
| 2015/0379873 A1* | 12/2015 | Tippelhofer | ........... | G08G 1/143 340/932.2 |
| 2017/0253237 A1* | 9/2017 | Diessner | ................ | B60W 50/14 |
| 2017/0272911 A1* | 9/2017 | Agrawal | ................ | G01S 5/0236 |

(Continued)

FOREIGN PATENT DOCUMENTS

| | | |
|---|---|---|
| CN | 101009049 A | 8/2007 |
| CN | 101937619 B | 10/2012 |

(Continued)

*Primary Examiner* — Ryan W Sherwin
(74) *Attorney, Agent, or Firm* — Li & Cai Intellectual Property (USA) Office

(57) ABSTRACT

A method for parking guidance and a parking guidance system are provided. The parking guidance system includes one or more access points located in a parking area that includes a plurality of parking spaces. Every access point collects parking information from parking space sensors disposed at different places of the parking area. The system provides an application that is executed in a device in a vehicle, and the application is used to communicate with the one or more access points. The method for parking guidance is performed in each of the access points. When one access point receives a parking request from the vehicle, the access point generates a message for indicating the available parking space to the driver.

20 Claims, 5 Drawing Sheets

(56) References Cited

U.S. PATENT DOCUMENTS

2018/0128638 A1* 5/2018 Lei .................. G06Q 20/145
2020/0209877 A1* 7/2020 Yoon ................ G01S 5/0244

FOREIGN PATENT DOCUMENTS

| CN | 202677628 U | 1/2013 |
| CN | 106409008 A | 2/2017 |
| CN | 105957159 B | 7/2018 |

* cited by examiner

METHOD FOR PARKING GUIDANCE AND PARKING GUIDANCE SYSTEM

FIELD OF THE DISCLOSURE

The present disclosure relates to a parking guidance technology, and more particularly to a parking guidance system and a method for parking guidance based on real-time parking information provided by one or more access points.

BACKGROUND OF THE DISCLOSURE

When a driver drives a car to a destination and attempts to find a vacant parking space, the driver generally needs to visually look for available parking space around the destination, or in some circumstances the driver can refer to the limited parking information such as a number of available parking spaces shown on an information display instructing a direction for getting to a parking space.

Further, a modern parking lot may introduce some advanced equipment for enhanced parking space indication. For example, an indicator, e.g., a light signal, can be disposed on every parking space of the parking lot, or a proprietary software program installed in the mobile phone of the driver can be provided for showing the status of each parking lot in order to assist the driver to select or find a parking space quickly.

Nevertheless, even if conventional technologies have provided many ways to assist the driver to find the parking space, there is still a need for providing a more effective way for drivers to quickly find a parking space.

SUMMARY OF THE DISCLOSURE

In response to the above-referenced technical inadequacy, the present disclosure provides a method for parking guidance and a parking guidance system.

In one aspect, the present disclosure provides a parking guidance system that includes one or more access points located in a parking area having a plurality of parking spaces and an application executed in a device in a vehicle. In an aspect of the disclosure, each of the one or more access points is able to collect parking information from a plurality of parking space sensors disposed at different places of the parking area, and the application is used to communicate with the one or more access points for receiving the message indicating the available parking area.

Each of the one or more access points performs a method for parking guidance. In the method, when an access point located in a parking area receives a parking request from a vehicle, the access point generates a message that indicates at least one available parking space within the parking area in response to the parking request after collecting parking information relating to the parking area. Afterwards, the message is transmitted to an application executed in a device in the vehicle.

In certain embodiments, the parking area includes a plurality of parking spaces and a plurality of access points. Each of the access points collects the parking information from a plurality of parking space sensors disposed at different places of the parking area. In an aspect of the disclosure, each of the access points includes a memory used to store specification relating to every parking space in the parking area and record information of available and unavailable parking spaces in the parking area. Moreover, each of the access points also integrates information of the plurality of parking spaces in the parking area from other one or more access points via a communication protocol.

In another aspect of the disclosure, if the message transmitted to the application indicates that no parking space is available to the vehicle, the access point transmits another message to guide the vehicle to another parking area under signal coverage of another access point.

Further, the parking request can be generated by the application executed in the device in the vehicle, and the parking request indicates information including a size and a type of the vehicle that allows the access point to compare with the parking information relating to the parking area in order to determine the available parking space appropriate for the vehicle to park.

Afterwards, the message transmitted to the application can guide the vehicle to the available parking space, for example, through a map of the parking area, or a voice, or a visual instruction that navigates the vehicle to reach the available parking space automatically.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
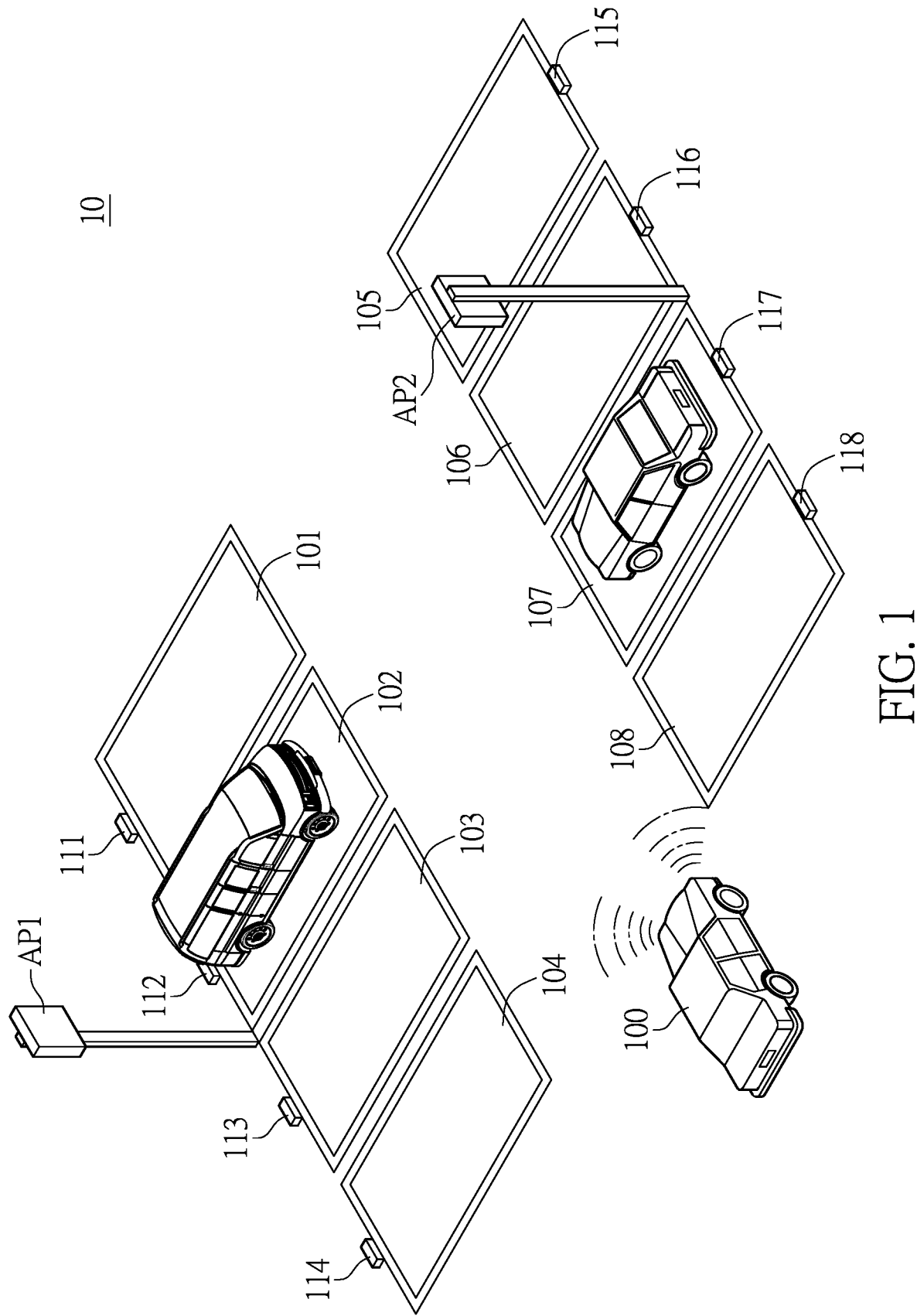
FIG. 1 is a schematic view depicting a scene of a parking area having a plurality of parking spaces where a plurality of sensors are disposed according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure is related to a parking guidance system that is installed in a parking area for providing parking guidance for a user who may be a driver of a vehicle when the vehicle enters the parking area to look for an available parking space. In an aspect of the present disclosure, the parking guidance system includes one or more access points located around the parking area that includes a plurality of parking spaces. The parking guidance system also provides an application that is executed in a device, e.g., a mobile phone of the driver, in the vehicle, and the application is able to communicate with the one or more access points via a wireless communication protocol when the vehicle approaches the parking area. Since the one or more access points can collect parking information from a plurality of parking space sensors disposed at different places of the parking area, the application is able to receive the parking information relating to any available parking space from the one or more access points while establishing a connection to the access points.

FIG. 1 is a schematic diagram depicting a circumstance of a parking area 10 having a plurality of parking spaces 101 to 108 where a plurality of sensors (e.g., sensors 111 to 118) are disposed according to one embodiment of the present disclosure.

FIG. 1 schematically shows the parking area 10 that includes the parking spaces numbered 101 to 108 which may be equipped with one or more parking space sensors (e.g., the sensors 111 to 118) for obtaining parking information of the parking area 10, e.g., detecting whether each of the parking spaces is occupied or is available for parking. Further, the parking guidance system provides one or more access points such as the access points AP1 and AP2 used to collect the parking information from the one or more parking space sensors (e.g., the sensors 111 to 118) disposed at different places of the parking area 10. For example, the access point AP1 can collect real-time parking information by the parking space sensors (e.g., the sensors 111 to 114) that can be disposed at the parking spaces 101 to 104, and the access point AP2 can collect the real-time parking information by the parking space sensors (e.g., the sensors 115 to 118) that can be disposed at the parking spaces 105 to 108.

In an exemplary example, the one or more parking space sensors can be implemented by a visualization method through a device that can be used to obtain the parking information of the parking area 10 by a real-time image processing process performed on the images taken by a camera. In one embodiment of the disclosure, the parking space sensor can be an optical sensor or a proximity sensor performing a light blocking method that is used to detect whether or not an object, i.e., a car, is present at the parking space. In one further embodiment, the parking space sensor can be a pressure sensor that can be buried under the parking space for detecting whether or not any vehicle is parked thereon. As shown in FIG. 1, a plurality of parking space sensors 111 to 118 can be disposed near the parking spaces 101 to 108 respectively for individually detecting parking statuses of every parking space.

In FIG. 1, a vehicle 100 enters the parking area 10 and a device (e.g., a mobile phone used by the driver, or an in-vehicle computer) in the vehicle 100 can communicate with any of the access points AP1 and AP2 in order to receive the parking information relating to the parking area 10, especially the real-time parking information about any available parking space within the parking area 10. In an aspect of the disclosure, in the meantime, the application executed in the device in the vehicle 100 can generate a parking request that can indicate information about the vehicle 100, for example, a size (e.g., length, width and height of the vehicle) and a type (e.g., a sport utility vehicle, a van, a sedan, a truck, an electric car, etc.) of the vehicle 100. It should be noted that the size and the type of the vehicle form parking limitations that are provided to the software process running in the access point for making a decision for parking suggestion. For making the parking suggestion, in addition to considering the size and the type of the vehicle, some other parking limitations of the vehicles with special functions such as an official car, a woman-and-child car and a handicapped car or the vehicles with special requirements such as an electric vehicle may also be in consideration. Therefore, when any of the access points AP1 and AP2 receives the parking request from the vehicle 100 after a requisite handshaking process, a software process running in the access point compares the parking request with the parking information relating to the parking area for determining an available parking space that is appropriate for the vehicle 100 to park in. Furthermore, a message sent to the vehicle 100 may be used to guide the driver to reach the available parking space.

Figure 2:
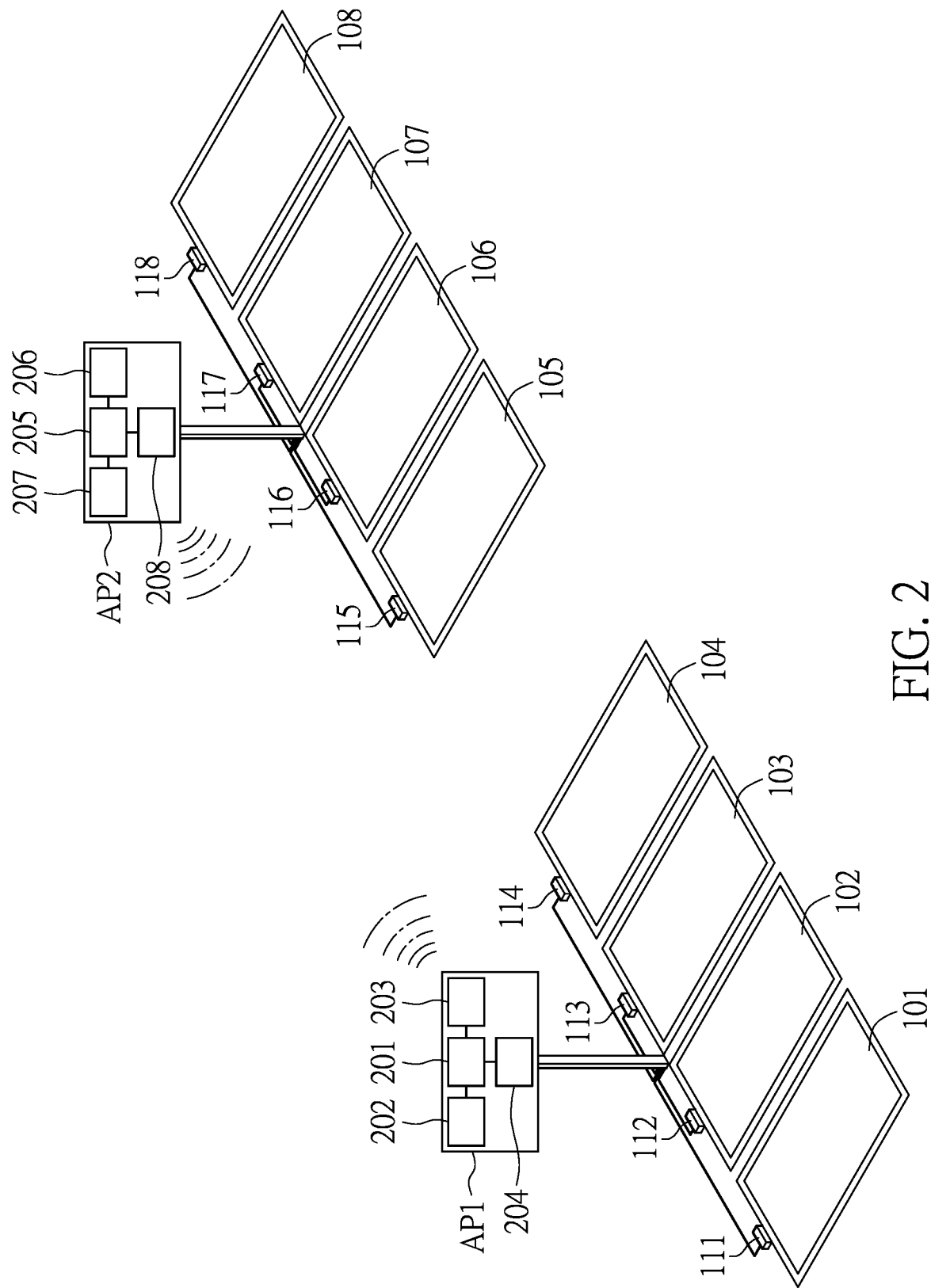
FIG. 2 is a schematic diagram depicting a parking guidance system including two access points that are intercommunicated with each other according to one embodiment of the present disclosure.

Next, reference is made to FIG. 2, which is another schematic diagram depicting the parking guidance system having the two access points AP1 and AP2 that are intercommunicated with each other according to another embodiment of the present disclosure.

Both the access points AP1 and AP2 can be intercommunicated with each other via a specific wireless communication protocol or a wired connection based on a preset communication protocol for periodically updating the parking information stored in the respective memories. For example, both the access points AP1 and AP2 include microprocessors (e.g., 201 and 205) that are used to perform the method for parking guidance when executing the related programs stored in their own memories 202 and 206. According to one embodiment of the present disclosure, in the method performed in both the access points AP1 and AP2, the microprocessors 201 and 205 can not only collect the parking information from the plurality of parking space sensors (e.g., the parking space sensors 111 to 118) disposed at different places of the parking area having the parking spaces 101 to 108, but also from the other access point (e.g., the access point AP1 or AP2).

Figure 4:
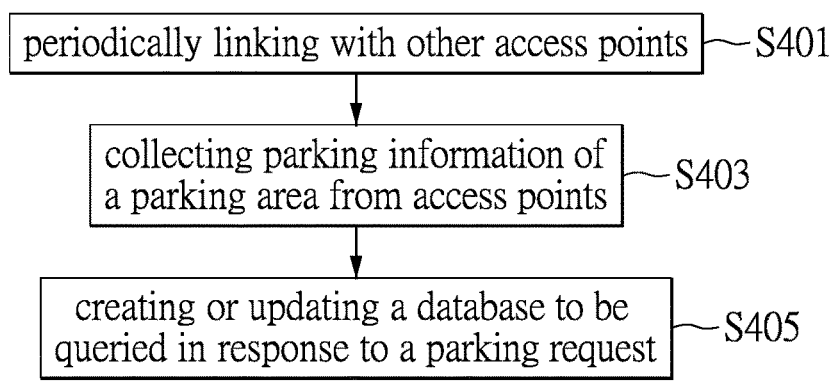
FIG. 4 is a flowchart describing a process in a method for parking guidance performed in an access point of the parking area according to one embodiment of the present disclosure.

Reference is made to FIG. 4, which is a flowchart describing a process in the method for parking guidance performed in each of the access points (e.g., the access points AP1 and AP2) of the parking area according to one embodiment of the present disclosure.

Both the access points AP1 and AP2 periodically or constantly receive sensing data from the plurality of parking space sensors (e.g., the parking space sensors 111 to 118) via sensor receivers 204 and 208. A connection is established between the access points AP1 and AP2 via the wireless communication protocol or the wired connection. As shown in step S401 of FIG. 4, the access points AP1 and AP2 are periodically linked with each other via their own communication units 203 and 207 for collecting parking information of the parking area from the other access point (step S403 of FIG. 4). A database can be created in the each of the memories 202 and 206 of the access points AP1 and AP2, respectively. Thus, when receiving the real-time parking information from the parking space sensors 111 to 118 or the other access point, the database is updated (step S405 of FIG. 4). It should be noted that the database in each of the access points AP1 and AP2 can be queried by the microprocessors 201 and 205 in response to a parking request issued from a vehicle.

Figure 3:
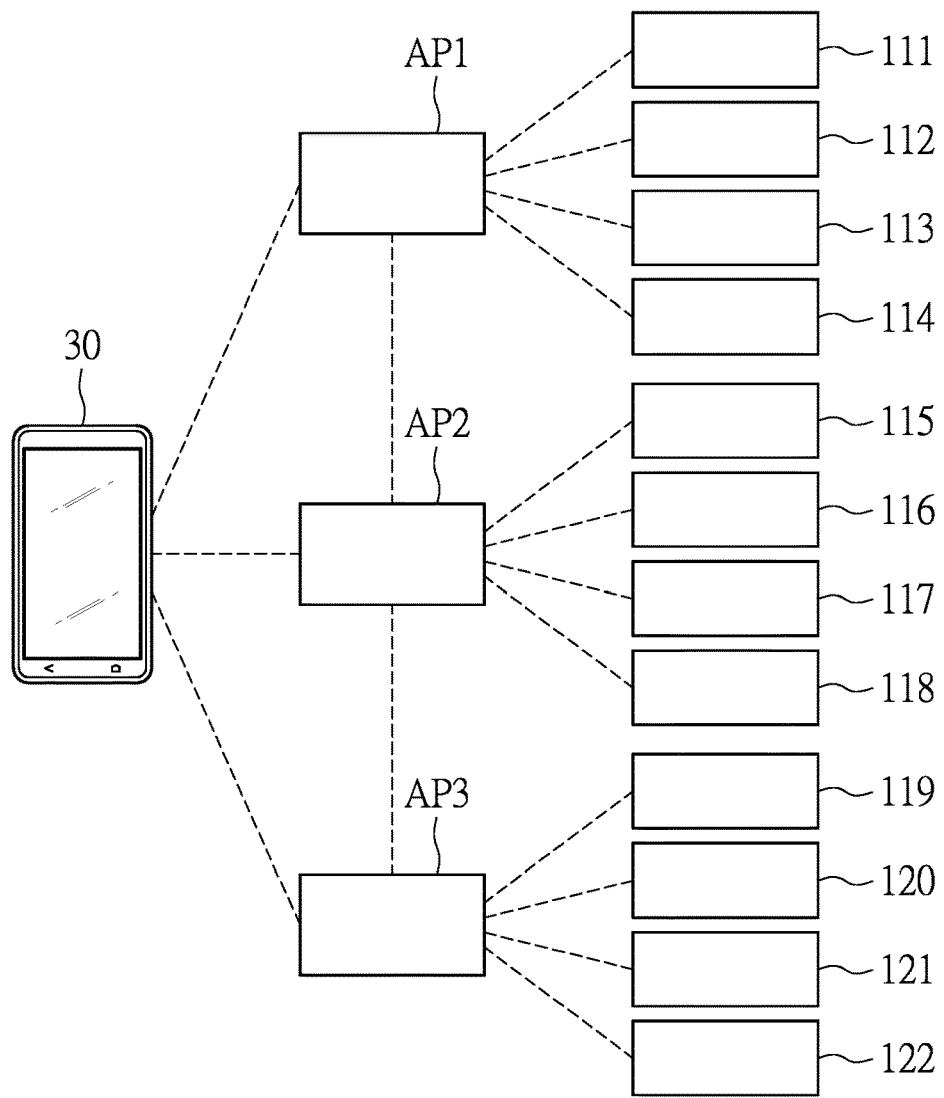
FIG. 3 is a schematic diagram depicting the parking guidance system providing an application executed in a device that can communicate with the plurality of access points of the parking area according to one embodiment of the present disclosure.

FIG. 3 is one further schematic diagram depicting the parking guidance system providing an application program executed in a device that can communicate with the plurality of access points of the parking area according to one further embodiment of the present disclosure.

A device 30 shown in FIG. 3 can be an in-vehicle computer, a mobile device used by a driver of a vehicle, or any computer device that is able to communicate with the access points AP1, AP2 and AP3 of the parking guidance system in the vehicle. In the present embodiment, the access point AP1 creates or updates a database in its memory by collecting parking information from the parking space sensors 111 to 114 disposed at different places of the parking area, the access point AP2 also creates or updates a database in its memory by collecting parking information from the parking space sensors 115 to 118, and the access point AP3 creates or updates a database in its memory by collecting parking information from the parking space sensors 119 to 122. Furthermore, several channels can also be established among these access points AP1, AP2 and AP3 which are intercommunicated based on a preset communication protocol in order to exchange with each other the real-time parking information collected respectively by the access points AP1, AP2 and AP3. Accordingly, the parking guidance system having the access points AP1, AP2 and AP3 implements a distributed parking management system based on a specific communication protocol, so that the parking area does not necessarily require an actual entrance.

According to one embodiment of the present disclosure, in the parking guidance system, the memory of each of the access points AP1, AP2 and AP3 retains the specification relating to every parking space in the parking area and records the real-time information of available and unavailable parking spaces in the parking area when the real-time parking information is periodically or constantly exchanged among the access points AP1, AP2 and AP3. Therefore, each of the access points AP1, AP2 and AP3 successfully integrates information of the plurality of parking spaces in the parking area from other one or more access points via a specific communication protocol. It should be noted that the parking information exchanged among the access points AP1, AP2 and AP3 allows the access point receiving the parking request to forward the parking request to another access point after a predetermined handshaking process if the message transmitted to the application indicates that no parking space is available to the vehicle. Then, the another access point can provide an available parking space to the device 30.

Figure 5:
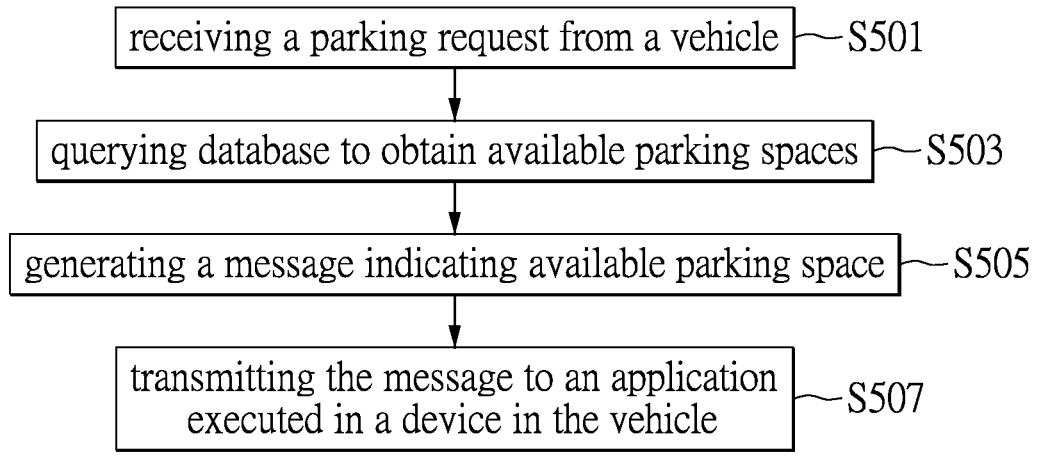
FIG. 5 is a flowchart describing another process in the method for parking guidance performed in the access point of the parking area according to one embodiment of the present disclosure.

When a vehicle approaches the parking area having the access points AP1, AP2 and AP3, a software process running in the device 30 can actively communicate with one (e.g., the access point that is nearest to the vehicle) of the access points AP1, AP2 and AP3 and receive parking information relating to the parking area. Reference is made to FIG. 5, which shows another flowchart describing a process in the method for parking guidance performed in the access point according to another embodiment of the present disclosure. The application executed in the device in the vehicle can determine the nearest access point based on at least a transmission time measured between the device and every access point and/or a response time of the packets broadcasted to these access points. Furthermore, the parking request sent to the access point may also include an identification data for recognizing the vehicle and then the identification data can be forwarded to the next access point when the original access point fails to provide any appropriate parking space to the vehicle.

Further, in one aspect of the disclosure, in addition to the identification data carried by the parking request generated by the application, when the application receives the message indicating one available parking space from any of the access points, the application can generate a booking signal that is configured to be sent to the access point, and the access point marks the available parking space for reserving the parking space and avoiding other vehicle to park.

After linking to one of the access points AP1, AP2 and AP3, a software process initiated by an application running in the device 30 generates and issues a parking request, e.g., a beacon signal, and the access point AP1, AP2 or AP3 receives the parking request from the vehicle (step S501). In one aspect of the disclosure, the content of the parking request may indicate information including a size and a type of the vehicle. It should be noted that, in practice, not every parking space is appropriate to every type or size of a vehicle, and the above-mentioned parking request allows the access point to determine not only whether or not any available parking space can be provided, but also if the available parking space is appropriate to the vehicle which issues the parking request. For example, a sport utility vehicle, a van, a sedan, a truck, an electric car, and a vehicle designed for handicapped people have different sizes and may not be able to fit the same parking space.

For example, if the vehicle entering the parking area is an electric car, the appropriate parking space for the electric car may be a parking space disposed with an electric charger, based on the requirement that can be carried in the parking request sent by the device in the vehicle. Further, a parking fee or a budget set by the driver may also be one of the conditions being referred to for the access point to decide the appropriate parking space.

After receiving the parking request, in step S503, the software process running in the access point queries the database created in the memory for obtaining any available parking space. After that, such as in step S505, a message indicating at least one available parking space or notifying there is no parking space is generated in the access point. In step S507, the message is transmitted to the application executed in the device in the vehicle. It should be noted that, if the message transmitted to the application indicates that no parking space is available to the vehicle, in one aspect, the access point can transmit another message to the device for guiding the vehicle to another parking area under signal coverage of another access point.

Figure 6:
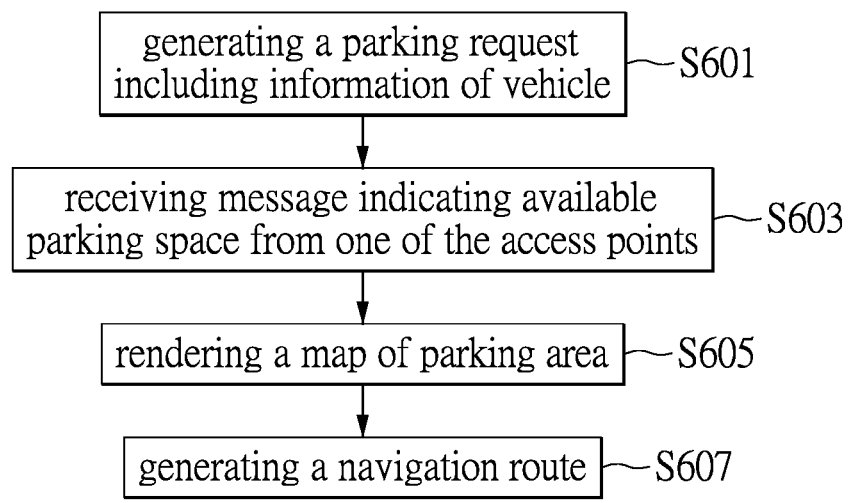
FIG. 6 is a flowchart describing a process performed in the application executed in the device according to one embodiment of the present disclosure.

According to one embodiment of the present disclosure, a specific process that can be referred to in the flowchart shown in FIG. 6 is performed by the application executed in the device in the vehicle according to one embodiment of the present disclosure.

When the vehicle approaches the parking area, the application may automatically or manually generate a parking request including information of the vehicle (step S601). For example, the application can obtain the location information of the vehicle at any time via a positioning circuit of the device, and also issue probing signals for searching the access points of the parking area based on a specific communication protocol. When any access point of the parking area is found, e.g., when the access point is detected to be within a distance threshold, the application can generate and issue the parking request carrying the information of the type or the size of the vehicle automatically. Alternatively, the application can generate a message to notify the driver that there is a parking area, and activate a function allowing the driver to decide whether or not to issue the parking request via a user interface. The access point receiving the parking request generates a message indicating any available parking space by querying the database of the access point. The application then receives the message that indicates there is an available parking space for the vehicle, or that indicates there is no available parking space appropriate to the vehicle from one of the access points (step S603).

In one aspect of the disclosure, the message received by the application can be used to render a visual instruction that navigates the vehicle to reach the available parking space automatically. In step S605, a map of the parking area or a series of instant navigation steps can be rendered in the application executed in the device. For example, the instant navigation steps prompt the driver with voice, text or direction indication shown on a screen or a glass such as "go straight for 100 meters, turn right, and then go straight for 100 meters, and the parking space is in front left." After that, such as in step S607, a navigation route can be generated on the map and used to guide the driver to arrive at a reserved parking space, i.e., the parking space marked by the software process running in the access point.

Figure 7:
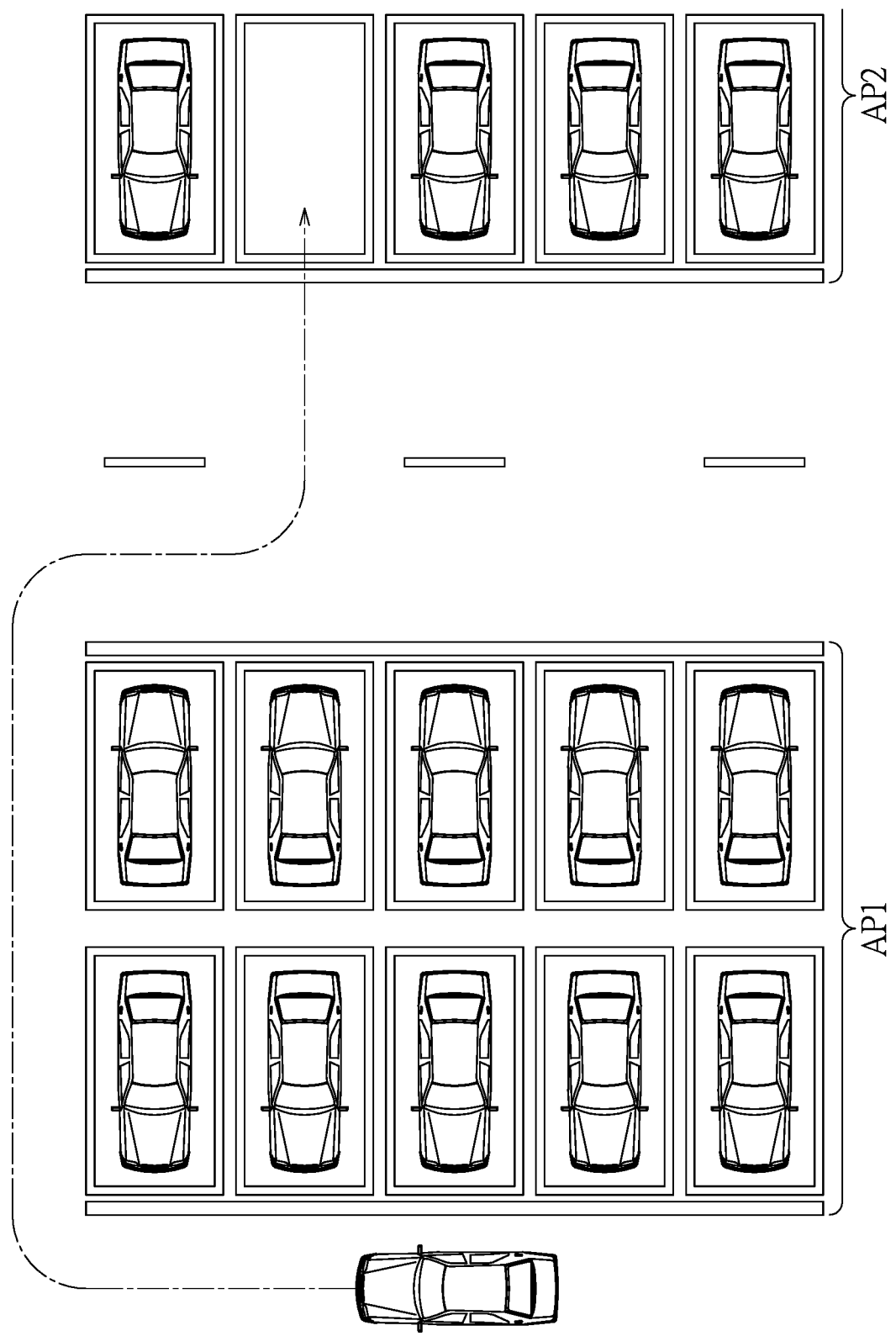
FIG. 7 is a schematic diagram depicting a scenario where a vehicle enters a parking area where the parking guidance system is provided according to one embodiment of the present disclosure.

Reference is made to FIG. 7, which is a schematic diagram depicting a circumstance that a vehicle 70 enters a parking area where the parking guidance system is provided according to one embodiment of the present disclosure.

In FIG. 7, two access points AP1 and AP2 are disposed in the parking area for respectively collecting the parking information relating to the plurality of parking spaces. The parking information collected by the two access points AP1 and AP2 respectively are exchanged for updating their own database in real time. When the vehicle 70 approaches the parking area, the application executed in the device in the vehicle 70 issues a parking request to one of the access points AP1 and AP2, and then receives the message indicating one or more available parking spaces, e.g., the available parking space 703, from the access point receiving the parking request. After that, the application may render a navigation route 701 from the present location of the vehicle 70 to the available parking space 703 according to the message.

In an exemplary example, for navigating the vehicle 70 along the navigation route 701 to the available parking space 703, the application executed in the device in the vehicle 70 can obtain a present location and a traveling direction of the vehicle 70 at any time through a positioning function. For example, a BLUETOOTH positioning technology can be adopted for obtaining the movement of the vehicle 70 based on the beacon signals being transmitted among nearby nodes in order to provide the navigation information including a direction and a distance to the available parking space 703. In an exemplary example, the navigation route 701 may render a path drawn on an electronic map displayed on a screen or on a windshield of the vehicle 70.

Furthermore, in an exemplary application, the above discussed aspects based on the parking guidance system and the method for parking guidance of the present disclosure can be applied to a self-driving vehicle, i.e., an autonomous vehicle that is driven by an autopilot system, and the parking guidance system can accordingly guide the self-driving vehicle to an appropriate parking space that can be reserved by the parking guidance system automatically. For example, the navigation route 701 shown on FIG. 7 can be introduced to the autopilot system so as to drive the autonomous vehicle to the reserved parking space.

According to one further embodiment of the present disclosure, the software process running in the access point can be used to calculate the parking fee being sent to the application executed in the device in the vehicle when the software process acknowledges that the vehicle leaves the parking space by the parking space sensors. After that, the application can be used to conduct a payment process.

In conclusion, according to the embodiments of the parking guidance system and the method for parking guidance of the present disclosure, the parking guidance system effectively provides an appropriate parking space of a parking area to the vehicle which issues a parking request to one of the access points disposed around the parking area that collects the latest parking information. In particular, one of the objectives of the parking guidance system of the present disclosure is to provide a distributed parking management system since the real-time parking information are maintained in the multiple access points according to one aspect of the present disclosure. Furthermore, the information carried in the parking request allows the access point or in another aspect any host that is connected to the access points to compare the parking request with the parking information relating to the parking area in order to determine the available parking space appropriate to the vehicle to park. Further, the message received by the application from the access point can be used to render a map of the parking area for assisting the vehicle to reach the available parking space. The parking guidance system and method for parking guidance of the present disclosure achieves an effective service for aiding the driver to arrive at the parking space.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for parking guidance, comprising:
receiving a parking request from a vehicle by an access point located in a parking area;
in the access point, generating a first message that indicates there is no available parking space for the vehicle within a parking area whose parking information is collected by the access point according to a database in a memory of the access point and transmitting the first message to an application executed in a device in the vehicle;
by the access point, transmitting a second message to guide the vehicle to another parking area whose parking information is collected by another access point;
in the access point, forwarding the parking request to the another access point;
in the another access point, generating a third message that indicates at least one available parking space within the another parking area in response to the parking request after collecting parking information relating to the another parking area; and
by the another access point, transmitting the third message to the application executed in the device in the vehicle.

2. The method according to claim 1, wherein the parking area having a plurality of parking spaces includes one or more access points and each of the access points collects the parking information from a plurality of parking space sensors disposed at different places of the parking area.

3. The method according to claim 2, wherein each of the access points includes the memory that stores a specification relating to each of the parking spaces in the parking area and records information of available and unavailable parking spaces in the parking area.

4. The method according to claim 3, wherein each of the access points integrates information of the plurality of parking spaces in the parking area from other one or more access points via a communication protocol.

5. The method according to claim 1, wherein the parking request is generated by the application executed in the device in the vehicle, and the parking request indicates information including a size and a type of the vehicle that allows the access point to compare the information including a size and a type of the vehicle with the parking information relating to the parking area so as to determine the available parking space that is appropriate for the vehicle to park in.

6. The method according to claim 5, wherein the message transmitted to the application guides the vehicle to the available parking space.

7. The method according to claim 6, wherein the message received by the application renders a map of the parking area for assisting the vehicle to reach the available parking space.

8. The method according to claim 6, wherein the message received by the application renders a voice for guiding a driver of the vehicle to reach the available parking space.

9. The method according to claim 6, wherein the message received by the application renders a visual instruction that navigates the vehicle to reach the available parking space automatically.

10. The method according to claim 1, wherein, when the application receives the message indicating one available parking space, the application generates a booking signal that is sent to the access point, and the access point marks the available parking space for preventing another vehicle from parking in the available parking space.

11. A method for parking guidance, comprising:
an application executed in a device in a vehicle determining a nearest access point located in a parking area when the vehicle approaches the parking area disposing at least two access points;
a software process running by the application actively communicating with the nearest access point; and
by the application, generating a parking request and transmitting the parking request to the nearest access point.

12. The method according to claim 11, wherein, in the access point receiving the parking request, a message that indicates at least one available parking space within the parking area in response to the parking request after collecting parking information relating to the parking area is transmitted to the application executed in the device in the vehicle.

13. The method according to claim 12, wherein the message transmitted to the application is used to guide the vehicle to the available parking space.

14. The method according to claim 13, wherein the message received by the application renders a map of the parking area for assisting the vehicle to reach the available parking space.

15. The method according to claim 13, wherein the message received by the application renders a voice for guiding a driver of the vehicle to reach the available parking space.

16. The method according to claim 13, wherein the message received by the application renders a visual instruction that navigates the vehicle to reach the available parking space automatically.

17. The method according to claim 12, wherein, when the application receives the message indicating one available parking space, the application generates a booking signal that is sent to the access point, and the access point marks the available parking space for preventing another vehicle from parking in the available parking space.

18. The method according to claim 11, wherein the parking area having a plurality of parking spaces includes the at least two access points and each of the access points maintains a database in a memory and the database includes real-time parking information that is collected from a plurality of parking space sensors disposed at different places of the parking area.

19. The method according to claim 18, wherein each of the access points includes a memory that stores a specification relating to each of the parking spaces in the parking area and records information of available and unavailable parking spaces in the parking area.

20. The method according to claim 11, wherein the parking request is generated by the application executed in the device in the vehicle, and the parking request indicates information including a size and a type of the vehicle that allows the access point receiving the parking request to compare the information including a size and a type of the vehicle with the parking information relating to the parking area so as to determine the available parking space that is appropriate for the vehicle to park in.

* * * * *